Sept. 12, 1950     N. H. GODLEY     2,521,909
HAYRAKE
Filed Aug. 27, 1948                                            4 Sheets-Sheet 1
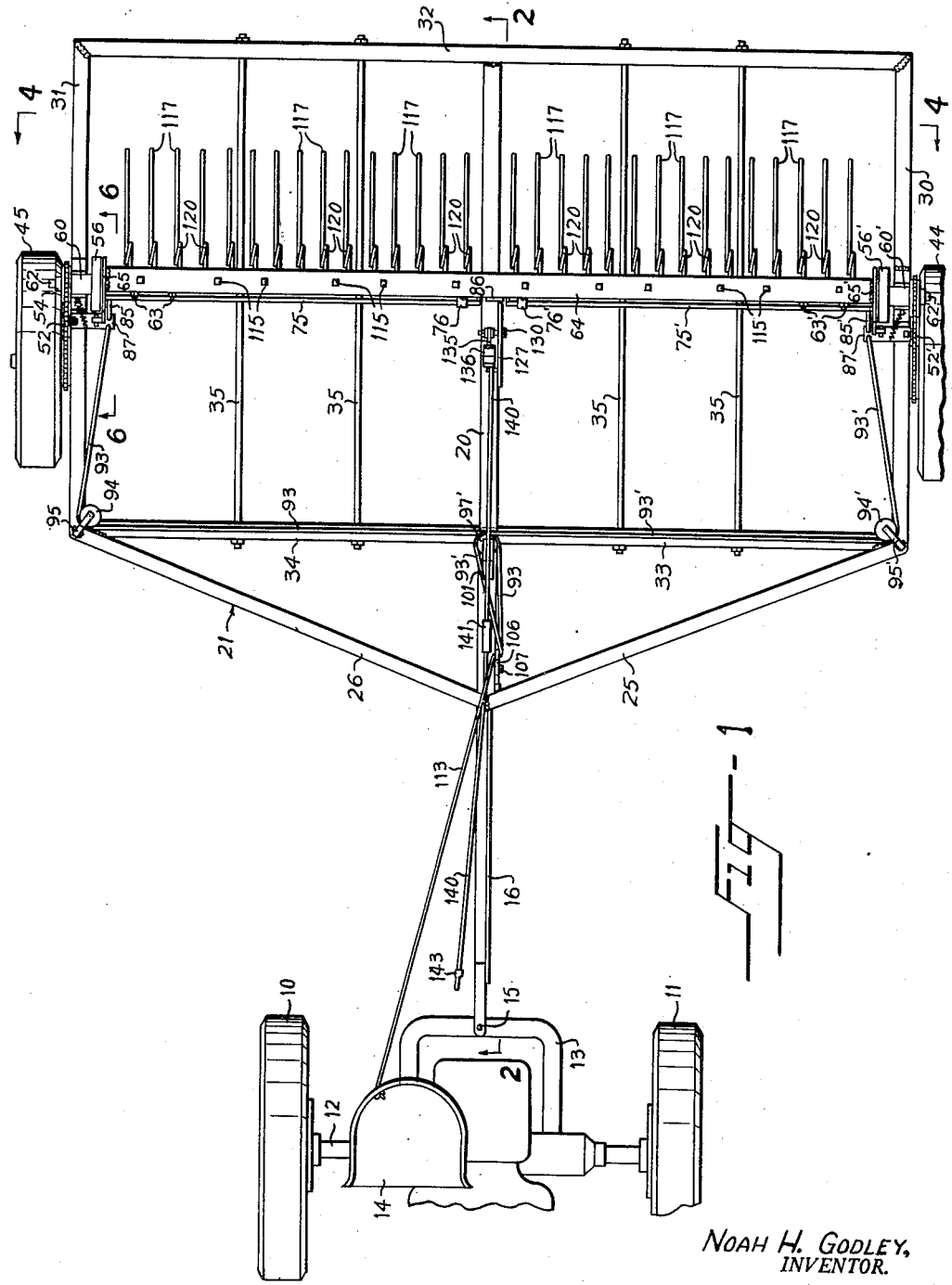
Noah H. Godley,
INVENTOR.
BY *Paul S Eaton*
ATTORNEY.

Sept. 12, 1950  N. H. GODLEY  2,521,909
HAYRAKE
Filed Aug. 27, 1948  4 Sheets-Sheet 2
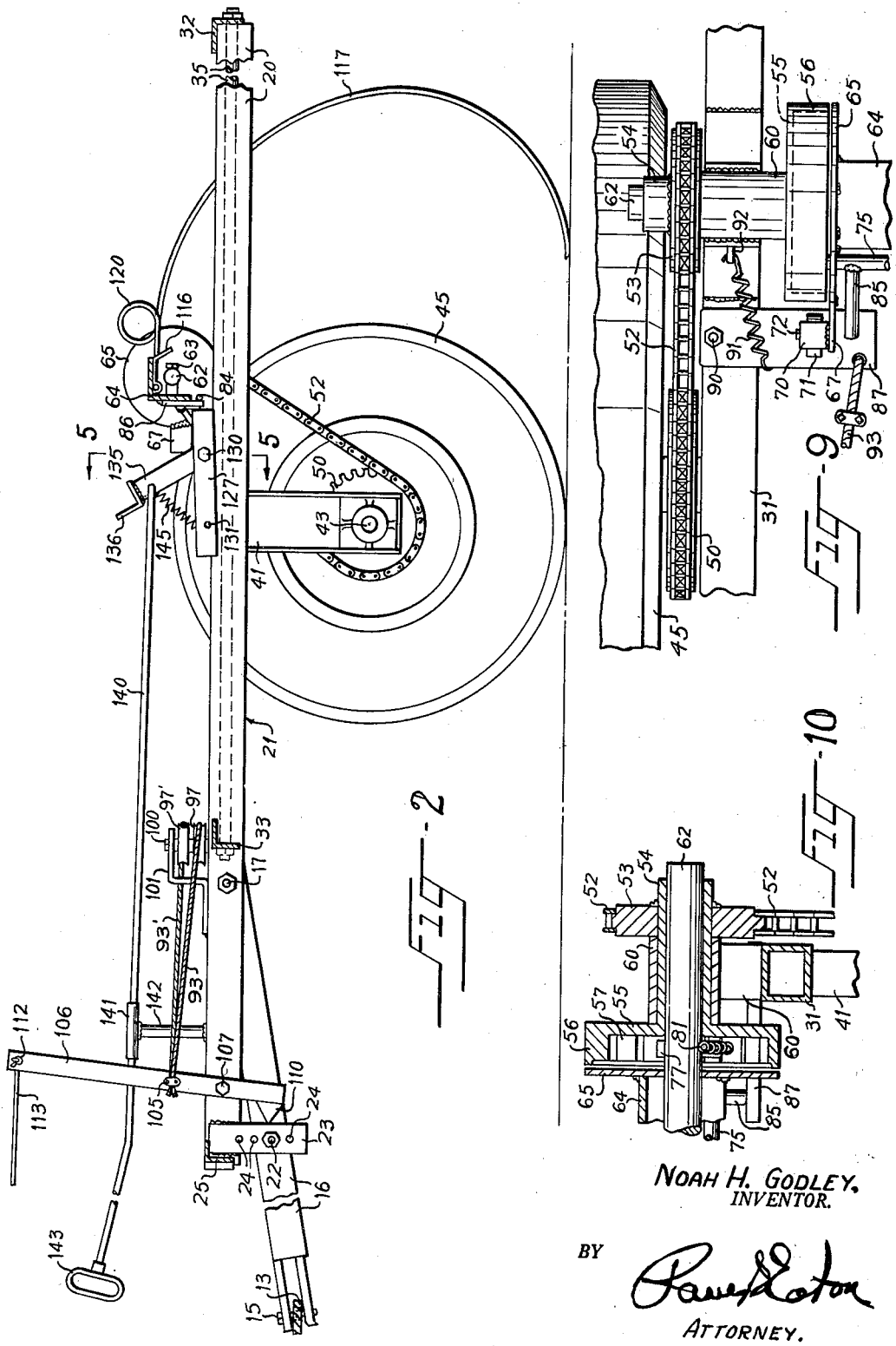
Noah H. Godley,
INVENTOR.
BY Paul Eaton
ATTORNEY.

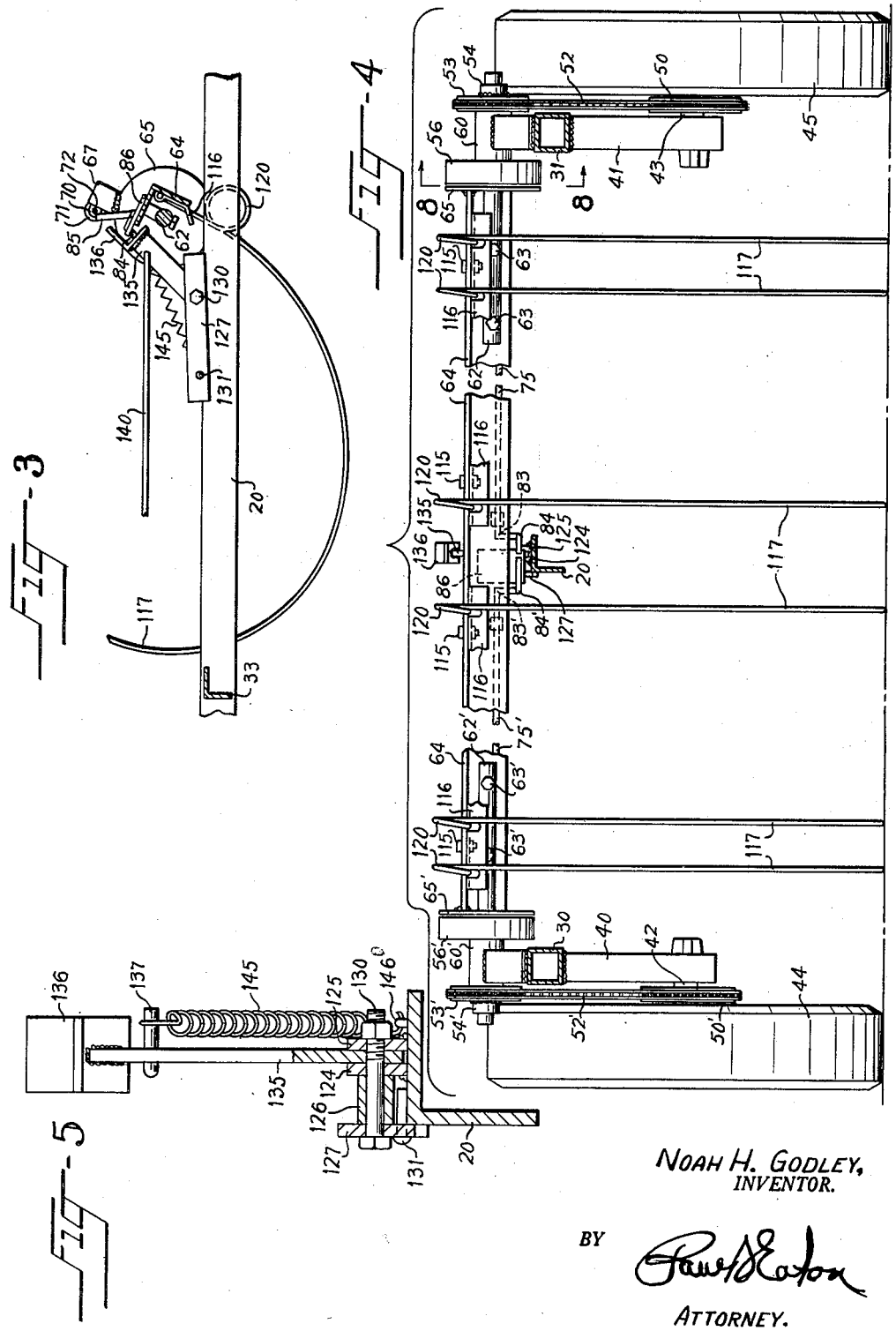

Sept. 12, 1950 N. H. GODLEY 2,521,909
HAYRAKE
Filed Aug. 27, 1948 4 Sheets-Sheet 4
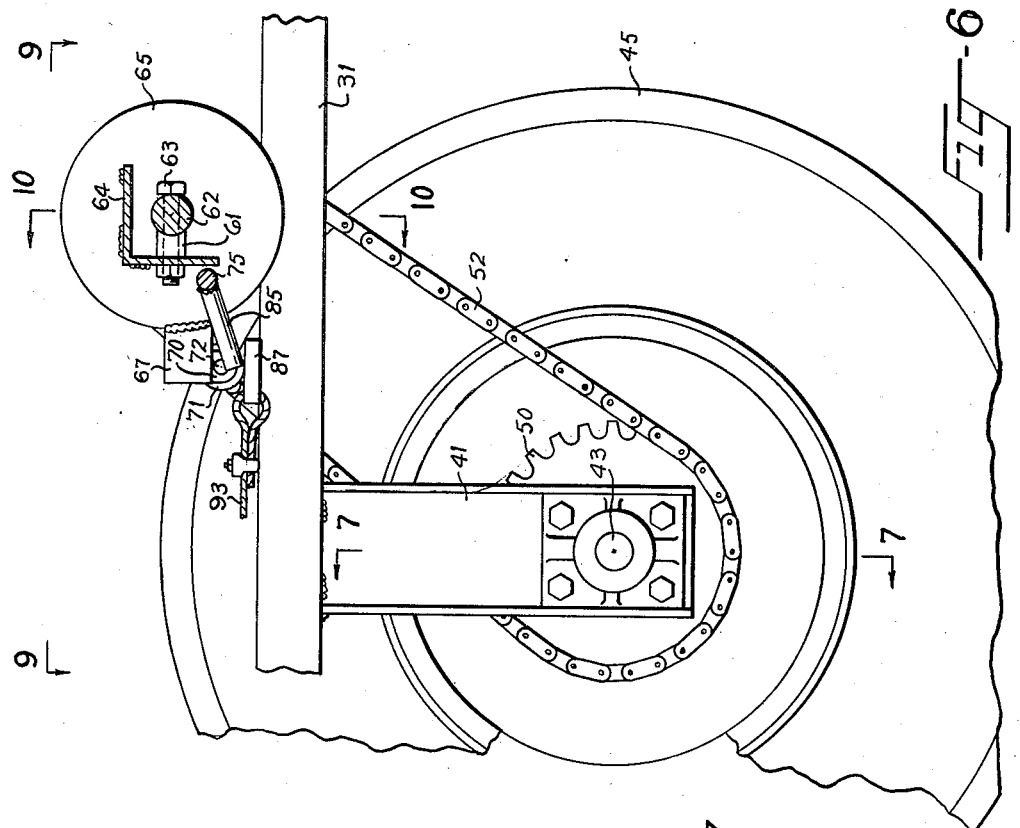
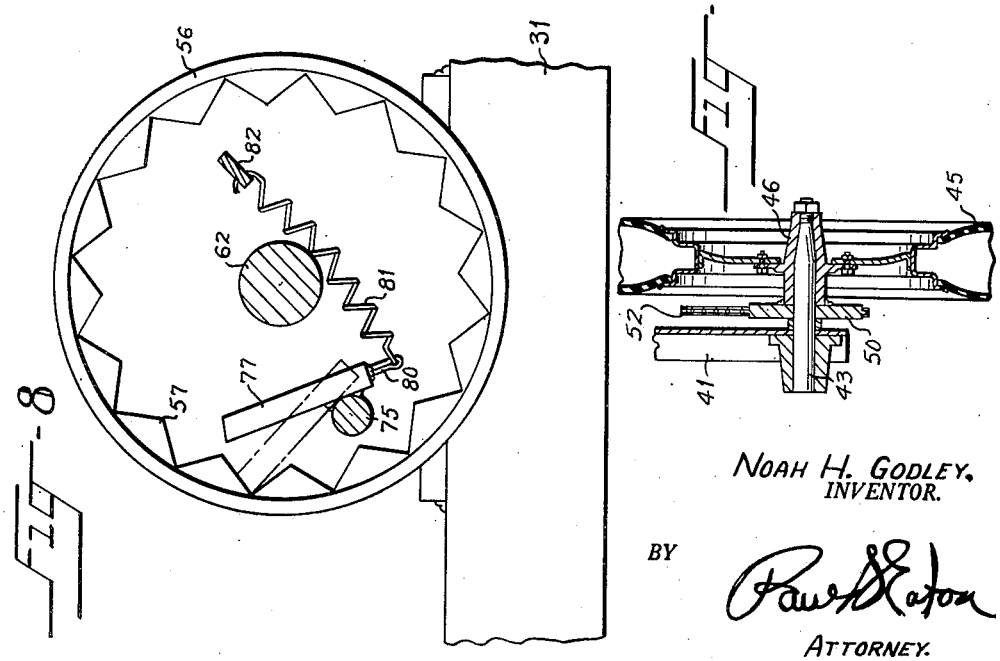
Noah H. Godley,
INVENTOR.
BY
Paul S. Eaton
ATTORNEY.

Patented Sept. 12, 1950

2,521,909

UNITED STATES PATENT OFFICE 2,521,909

HAYRAKE

Noah H. Godley, Charlotte, N. C.

Application August 27, 1948, Serial No. 46,397

7 Claims. (Cl. 56—391)

1

This invention relates to a hay rake of a type such as is adapted to be pulled over the ground and having rearwardly and downwardly and forwardly curved tines thereon and which form windrows perpendicular to the path of travel of the hay rake.

It is an object of this invention to provide a wheeled rectangular frame which is adapted to be pulled by any suitable means such as a tractor and having a transverse rotatable bar extending longitudinally through the center of the rectangular frame, and the transverse bar having a plurality of spaced tines thereon and manually controlled means for revolving the transverse bar and its associated tines a complete revolution as desired.

It is another object of this invention to provide a hay rake of the type described and having means associated therewith whereby the transverse bar and its associated tines may be rotated approximately one-half revolution to where the tines will remain in a raised position for transporting the rake from one location to another.

It is another object of this invention to provide a rake of the type described wherein the rake comprises a wheeled rectangular frame having manually controlled means driven by the wheels on the wheeled frame for automatically rotating the tines of the rake a complete revolution for dumping the hay from the tines, thereby permitting the tines to be drawn clear of the windrow at each dumping operation.

Some of the objects of the invention having been stated, other objects will appear as the description proceeds, when taken in connection with the accompanying drawings, in which:

Figure 1 is a top plan view of the rake and showing a portion of a tractor to which the rake is connected;

Figure 2 is an enlarged elevation with parts in section and being taken along the line 2—2 in Figure 1;

Figure 3 is an elevation with parts in section showing the central portion of Figure 2 with parts in a different position;

Figure 4 is an enlarged rear view of the hay rake with parts in section and with parts broken away and is taken substantially along the line 4—4 in Figure 1;

Figure 5 is an enlarged vertical sectional view taken substantially along the line 5—5 in Figure 2;

Figure 6 is an enlarged vertical sectional view taken along the line 6—6 in Figure 1;

2

Figure 7 is a vertical sectional view taken substantially along the line 7—7 in Figure 6 and showing the parts on a smaller scale;

Figure 8 is an enlarged elevation with parts in section and being taken substantially along the line 8—8 in Figure 4;

Figure 9 is an enlarged top plan view of the structure shown in Figure 1 adjacent the uppermost ground wheel and being taken substantially along the line 9—9 in Figure 6;

Figure 10 is a vertical sectional view taken along the line 10—10 in Figure 6.

Referring more specifically to the drawings, the numerals 10 and 11 denote the ground wheels of a conventional tractor and are mounted on opposite ends of a rear axle 12 to which a U-shaped draw bar 13 is secured in a conventional manner. The tractor also has a conventional seat 14 thereon. Pivotally connected as at 15 to the U-shaped draw bar 13 is the front end of a rearwardly extending bar 16 which is pivotally connected at its rearmost end as at 17 to a forwardly and rearwardly extending intermediate frame member 20 of a rectangular frame broadly designated at 21.

Forwardly of its pivot point 17, the bar 16 is adjustably secured by a bolt 22 to a vertically disposed plate 23 having a plurality of bores 24 therein which are adapted to be penetrated by the bolt 22 for adjustably securing the bar 16 as to angularity to the same. The upper end of the plate 23 is secured as by welding near the front end of the intermediate frame member 20. Welded to the front end of the member 20 are front ends of rearwardly diverging angle bars 25 and 26, the remote ends of which are welded to rearwardly extending tubular bars 30 and 31, respectively. The rearmost ends of the tubular shaped bars 30 and 31 are welded to a transverse angle bar 32 (Figures 1 and 2) to which the rearmost end of the intermediate frame member 20 is also welded.

Welded to opposite sides of the intermediate frame member 20 are the proximate ends of angle bars 33 and 34, the opposite ends of which are welded at the juncture of the angle bars 25 and 26 with the tubular bars 30 and 31. Extending between the angle bars 33 and 34 and the angle bar 32 are tie rods 35 which not only serve to lend rigidity to the rectangular frame 31, but also serve as means for doffing the hay from the tines as the tines pass by the tie rods 35 in a dumping operation as will be later described.

Welded to the lower surfaces of the tubular members 30 and 31 intermediate their ends are downwardly extending bars 40 and 41, respectively, (Figure 4) having stub axles 42 and 43, respectively, fixedly mounted therein. These axles 42 and 43 have ground wheels 44 and 45, respectively, rotatably mounted thereon and it may be observed in Figure 7 that these ground wheels have hub portions 46 integral therewith, respectively, on the proximate sides of which sprocket wheels 50 and 50', respectively, are welded. The structure associated with the ground wheel 45 being identical to the structure associated with the ground wheel 44, the same reference characters will apply with the prime notation added to the structure associated with the ground wheel 44 as apply to the structure associated with the ground wheel 45.

The sprocket wheel 50 has a sprocket chain 52 mounted thereon which extends upwardly and is mounted on a sprocket wheel 53 secured as by welding to a tubular hub portion 54 (Figure 9) of a disk 55 having an annular ring 56 integral therewith. The annular ring 56 has a plurality of teeth 57 cut in the internal periphery thereof and the tubular portion 54 of the disk 55 is rotatably mounted in a bearing block 60 secured, as by welding, to the tubular frame member 31. The similar bearing block 60' is secured as by welding to the tubular frame member 30.

Rotatably mounted in the tubular hub portions 54 and 54' of the disks 55 and 55' are stub shafts 62 and 62' which extend inwardly toward each other and are secured, as by bolts 63 and 63' to a transverse angle bar 64. It will be noted in Figure 6 that the shaft 62 is held in spaced relation to the angle bar 64 by sleeves 61 which are penetrated by the bolts 63. The opposite ends of the bar 64 terminate adjacent the proximate sides of the annular rings 56 and 56', respectively, integral with the disks 55 and 55' and have second disks 65 and 65' welded to the remote ends thereof (Figures 1, 4, 6, 9 and 10).

The disk 65 and the disk 65' are penetrated by the shafts 62 and 62', respectively, and the disk 65 has a forwardly projecting portion 67 extending from the periphery thereof in Figures 2, 6 and 9 and this forwardly projecting portion 67 has a U-shaped member 70 welded integral therewith in which a wheel 71 is rotatably mounted on a transverse shaft 72 secured in the inverted U-shaped member 70. Oscillatably mounted in the disks 65 and 65' are the remote ends of transverse oscillatable shafts 75 and 75' which extend inwardly toward each other and are oscillatably mounted in bearing blocks 76 and 76' welded to the front surface of the transverse angle bar 64 adjacent opposite sides of the intermediate frame member 20. The shafts 75 and 75' are then bent downwardly at right angles as at 83 and 83', respectively, and then rearwardly and inwardly toward each other as at 84 and 84', respectively (Figure 4), and these portions 84 and 84' are adapted to engage the rear surface of a vertically disposed plate member 86 (Figure 2) which extends upwardly and is secured as by welding intermediate the ends of the transverse angle bar 64.

The shaft 75 penetrates the disk 65 and extends into the annular ring 56 of the disk 55 and has welded integral therewith a dog 77 (Figure 8), the free end of which is adapted to engage the teeth 57 on the interior of the annular ring 56, as desired, for transmitting rotation to the tines, to be later described, and the bar 64 in a dumping operation. The opposite end of the dog 77 has a spring perch 80 integral therewith to which one end of a tension spring 81 is connected, the other end being connected to a spring perch 82 welded integral with the disk 65. Welded to the shafts 75 and 75' adjacent the proximate surfaces of the disk 65 and the disk 65' are outwardly projecting fingers 85 and 85' (Figures 1 and 9) and it will be noted that the free end of the finger 85 as well as the wheel 71 are adapted to engage a horizontally disposed detent in the form of a plate member 87. The horizontally disposed plates 87 and 87' are pivotally mounted as at 90 and 90', respectively, on the tubular frame members 31 and 30, respectively (Figure 9). The horizontally disposed plates 87 and 87' have tension springs 91 and 91' connected to the front edges thereof and extending rearwardly therefrom and the rearmost ends of the tension springs 91 and 91' are connected to spring perches 92 and 92', respectively, welded to the front surfaces of the bearing blocks 60 and 60', respectively.

Cables 93 and 93' are secured to the free ends of the plates 87 and 87', respectively, and these cables extend forwardly and pass around pulleys 94 and 94' (Figure 1) rotatably mounted in brackets 95 and 95', respectively, welded to the top surfaces of the angle bars 26 and 25, respectively, at the rear ends thereof. The cables 93 and 93' then extend inwardly toward each other and pass around a pair of superposed pulleys 97 and 97', respectively, (Figure 2) rotatably mounted on a vertically disposed bolt 100, the upper end of which is secured in a bracket 101 secured as by being welded to the intermediate frame member 20 adjacent the front end thereof and the lower end being secured in the intermediate frame member 20.

The cables 93 and 93' then extend forwardly and are secured as at 105 to a medial portion of a substantially vertically disposed lever bar 106 which is pivotally mounted therebelow as at 107 to the intermediate frame member 20. The lower end of the lever arm 106 has a bunter 110 integral therewith which engages the rearmost vertical surface of the vertically disposed plate 23, heretofore described, to thus restrict rearward movement of the proximate ends of the horizontally disposed plates 87 and 87' connected to the other ends of the cables 93 and 93', respectively. The upper end of the lever bar 106 has secured thereto, as at 112, the rearmost end of a cable 113 which extends forwardly and is suitably secured to the seat 14 of the tractor within easy reach of the operator (Figure 1).

Secured to the angle bar 64 as by bolts 115 are a plurality of longitudinally extending angle bars 116 (Figure 4), each of which has a plurality of conventional tines 117 secured thereto in a conventional manner which extend rearwardly and downwardly and forwardly and each of these tines 117 is coiled as at 120 to thus permit the tines to resiliently engage the ground over which the rake is being drawn.

A pair of upwardly extending ears 124 and 125 (Figure 5) are welded at their lower ends to the intermediate frame member 20 forwardly of and adjacent to the transverse angle bar 64 (Figure 2). The left-hand side of the ear 124 in Figure 5 is engaged by a sleeve 126, the left-hand end of which is adapted to engage a pivoted arm 127. The pivoted arm 127 and the spacer sleeve 126 are pivotally secured, as by a bolt 130, to the upwardly extending ears 124 and 125. The left-hand end of the pivoted arm 127 in Figure 2 has a pin 131 secured therein as by a pressed fit and this pin extends over the intermediate frame member 20, and inasmuch as the pivoted arm is substantially longer from the pivot point to the left-hand end thereof than it is to the right-hand end thereof from the pivot point, the weight of the left-hand portion of the pivoted arm 127 is supported by the pin 131 engaging the top surface of the intermediate frame member 20. The right-hand end of the pivoted arm 127 in Figure 2 is adapted to intermittently engage the front surface of the vertically disposed plate 86 to thus prevent the tines 117 from swinging too far forwardly at their lower ends which may be the case in moving the rake over rough terrain.

Attention is called to the fact that as the angle bar 64 rotates in the manner heretofore described, the lower edge of the plate 86 in Figure 2 engages the right-hand end of the pivoted arm 127 simultaneously with the engagement of the plate 87 by the finger 85 thus moving this end of the pivoted arm 127 downwardly to permit the plate 86 to pass thereby, after which the pivoted arm 127 will come to rest in its original position as shown in Figure 2.

Referring to Figures 2, 3, and 5, it may be observed that the upwardly extending ears 124 and 125 have the lower end of an upwardly extending arm 135 mounted therebetween and being pivotally mounted on the bolt 130. The arm 135 extends upwardly and has an angle clip 136 welded to the upper end thereof which is provided for holding the tines in a raised position, during transit of the rake from one location to another, in a manner to be later described.

The arm 135 is penetrated adjacent its upper end by a transverse portion 137 of a forwardly extending control rod 140. This control rod is mounted for horizontal sliding movement in a tubular member 141 welded to the upper end of the vertically disposed rod 142. The tubular member is welded at its lower end adjacent the front end of the intermediate frame member 20. This control rod 140 then extends forwardly beyond the tubular guide member 141 and has a handle member 143 suitably secured thereon, and it will be noted in Figure 1 that this handle member is disposed adjacent the rear end of the tractor where it may be within easy reach of the operator, and inasmuch as the control rod 140 is inherently rigid, additional supporting means is not necessary at the front end thereof in Figure 1. The inwardly bent portion 137 in Figure 5 serves as a spring perch for a tension spring 145 which extends forwardly and downwardly at an angle and is connected at its lower end to a spring perch 146 secured to the top surface of the intermediate frame member 20.

Method of operation

Assuming that the tractor and the rake in Figure 1 are moving from right to left and that the parts of the rake are in the operating position shown in Figure 2 and that the tines 117 have picked up a sufficient amount of hay to warrant a dumping operation the cable 113 is grasped by the operator of the tractor and is pulled forwardly, or from right to left in Figures 1 and 2, thus moving the lever 106 in a counterclockwise direction in Figure 2, whereby the cables 93 and 93' connected thereto will move the horizontally disposed plates 87 and 87' forwardly at their proximate ends in Figure 1.

Now, as the plate 87 moves forwardly (Figure 9), this will permit the free end of the finger 85 to be moved downwardly by the tension spring 81 in Figure 8 and will consequently partially rotate the shaft 75 having the dog 77 on the end thereof within the annular ring 56. As the shaft 75 partially rotates in a counterclockwise direction in Figure 8, the dog 77 is moved from the solid line position to the dotted line position in Figure 8 to where the dog will engage one of the teeth 57 integral with the annular ring 56. Now, inasmuch as the ground wheel 41 is rotating, rotation will be imparted through the sprocket wheels 50 and 53 and the sprocket chain 52 to the disk 55 at all times while the rake is in motion, thus causing the annular ring to rotate in a counterclockwise direction in Figure 8.

As the free end of the dog 77 engages one of the teeth 57 in the annular ring 56, the rotation of the annular ring 56 will cause the shaft 75 to rotate in unison therewith about the axis of the annular ring 56 and inasmuch as this shaft 75 is oscillatably mounted in the disk 65, this will cause the disk 65 to also rotate with the disk 55 when the dog 77 is in engagement with the teeth 57 in Figure 8.

The transverse angle bar 64 on which the tines 117 are mounted, being welded to the proximate sides of the disks 65 and 65' will thus be caused to rotate in a counterclockwise direction in Figures 2 and 6, thus moving the free ends of the tines 117 in an arcuate path about the axis of the shafts 62 and 62' which will, of course, withdraw the tines from the hay that has been picked up by the same. Now, as these tines 117 are moved upwardly in a counterclockwise direction in Figure 2, the tie rods 35 will further assist in removing the hay from the tines 117 as they pass thereby.

Due to the pressure of the teeth 57 against the free end of the dog 77, in Figure 8, during rotation of the transverse angle bar and associated parts, the dog 77 will remain in engagement with the teeth 57 until a revolution has been completed by the angle bar 64, at which time the free end of the finger 85 will again engage the top surface of the plate 87, it being understood that the cable 113 is released by the operator immediately upon rotation of the transverse angle bar 64 being commenced.

Now, as the cable 113 is released, the tension springs 91 and 91' will cause the plates 87 and 87' to move rearwardly at their proximate ends to thus again enter the path of travel of the free ends of the fingers 85 and 85'.

The finger 85 will then engage the top surface of the plate 87 and simultaneously the roller 71 will also engage the top surface of the plate 87 to thus limit rotation of the transverse angle bar 64 until the cable 113 is again moved forwardly by the operator.

When it is desired to arrest rotation of the transverse angle bar 64 with the associated tines 117 in elevated position, such as in the position shown in Figure 3, for transport purposes from one location to another, the dog 77 in Figure 8 is again moved into engagement with the teeth 57 in the annular ring 56 in the manner heretofore described, and the handle portion 143 of the control rod 140 is then moved rearwardly, or from left to right in Figure 2, by the operator, and is held in this position manually until the parts reach the position shown in Figure 3, at which time the portions 84 and 84' of the transverse shafts 75 and 75' are engaged by the angle clip 136 which will thus impart partial rotation to the associated shafts 75 and 75' to thereby move the free end of the dogs 77 and 77' at the opposite ends thereof out of engagement with the teeth 57 in the disks 56, thereby permitting the disk 55 to continue its rotation, but arresting rotation of the bar 64 and the tines 117 associated therewith. By referring to Figure 3, it is thus seen that the tines 117 would be held in a raised position out of engagement with the ground and would thereby permit transportation of the rake from one location to another.

The weight of the tines and the angle bar 64 associated therewith will cause the arm 135 to remain in the position shown in Figure 3, inasmuch as the tension of the tension spring 145 is not great enough to overcome this weight, but when this weight is removed, spring 145 will move the arm 135 forwardly to position shown in Figure 2. However, the tension spring 145 is provided so that the arm 135 will move forwardly at its upper end automatically if the handle 143 is moved rearwardly inadvertently. When it is desired to again lower the free ends of the rake tines 117 into engagement with the ground for a raking operation, the handle member 143 may then be moved forwardly by the operator, thus moving the arm 135 to the position shown in Figure 2 to where the parts will again resume normal operation.

In the drawings and specification there has been set forth a preferred embodiment of the invention, and although specific terms are employed, they are used in a generic and descriptive sense only, and not for purposes of limitation, the scope of the invention being defined in the claims.

I claim:

1. An improvement in a hay rake having a framework provided with supporting wheels at the sides thereof and having a draw bar secured to the front end of the framework and having means for attaching the same to the rear end of a tractor, said framework having bearing members mounted thereon adjacent the wheels disposed at each side of the framework and each bearing member having a tubular hub portion rotatably mounted therein and each tubular hub portion having a disk integral therewith and said disk having an annular rim portion on one side thereof and having teeth cut in the inside surface thereof, said rake also having a driving connection between the adjacent wheels disposed at the sides of the framework and the sleeve of the disk for transmitting rotation to the disk as the rake is pulled by the tractor, said improvement comprising a stub shaft rotatably mounted in the tubular hub portion and the disk and having a second disk integral therewith and also having an angle bar secured to and extending between the stub shafts, said second disk being adjacent the annular rim portion on the first disk, said bar extending to the other of the bearing members, a plurality of tines secured to the bar, an oscillatable shaft disposed in parallel relation to the stub shaft and oscillatably penetrating the second-named disk and entering the annular rim portion on the first-named disk, a dog integral with the end of the shaft disposed within the annular rim portion of the first-named disk, manually controlled means for partially rotating the shaft to thus move the associated dog into engagement with any one of the teeth in the annular rim portion of the first-named disk, whereby rotation will be transmitted from the first-named disk to the second-named disk and the angle bar secured thereto and its associated tines for a dumping operation.

2. In a structure according to claim 1, means for automatically transmitting partial rotation to the oscillatable shaft on which the dog is mounted for disengaging the dog from the teeth in the annular rim portion of the first-named disk upon completion of a revolution by the second-named disk and the angle bar and the tines associated therewith to thus stop rotation thereof.

3. In a structure according to claim 2, said means for automatically transmitting a partial rotation to the oscillatable shaft on which the dog is secured comprising a finger integral with the shaft and disposed adjacent the second-named disk, a plate pivotally secured to the rectangular frame and extending inwardly therefrom into the path of the finger integral with the oscillatable shaft, remotely disposed means for manually moving the free end of the plate out of the path of the finger projecting from the oscillatable shaft and spring means for urging the free end of the pivoted plate to its original position after being released to thus move the dog out of engagement with the teeth in the first-named disk upon completion of a revolution of the second-named disk and associated parts.

4. In a structure according to claim 2, second manually controlled means for automatically moving the dog out of engagement with the teeth in the first-named disk after a predetermined part of a revolution for arresting rotation of the second-named disk and the associated parts with the tines in an elevated position.

5. In a structure according to claim 4, said second manually controlled means for arresting rotation of the second-named disk and associated parts comprising an eccentrically bent portion integral with said oscillatable shaft, a pivoted arm disposed adjacent the path of travel of the eccentrically bent portion of the oscillatable shaft and a control rod extending from the pivoted arm to a point adjacent the tractor whereby movement of the control rod will move the associated pivoted arm into the path of the eccentrically bent portion of the oscillatable shaft to thus transmit a partial rotation to the oscillatable shaft to move the associated dog out of engagement with the teeth in the first-named disk, thus arresting rotation of the second disk and associated parts with the tines in an elevated position.

6. An improvement in a hay rake having a horizontally disposed frame provided with ground wheels at each side thereof and having bearings disposed above the ground wheels and having a sleeve rotatably mounted in each of the bearings and having a driving connection between each sleeve and its associated ground wheel and each sleeve having a disk integral therewith and provided with an annular laterally projecting rim portion with teeth cut in its inner surface, said rake also having a pair of stub shafts rotatbly mounted in the sleeves and the disks and each stub shaft having a second disk secured thereon adjacent the first disks and each of the second disks having an oscillatable shaft mounted therein, the stub shafts having the ends of a tine frame secured thereto, the improvement comprising each of the oscillatable shafts having a finger extending laterally therefrom, each of the second disks having a forwardly projecting portion extending therefrom, an oscillatable detent member mounted on the frame and normally biased to occupy a position in the path of the forwardly projecting portion and the finger, said oscillatable shaft having a dog integral therewith disposed within the annular rim portion of the first-named disks, manually operable means for moving the oscillatable detent member out of the path of the finger and forwardly projecting portion to thus allow the dog on said oscillatable shaft to move into engagement with any one of the teeth in the annular rim portion of said first-named disks to impart rotation to the tine frame, said oscillatable shafts extending to a medial portion of the tine frame and each having a crank portion thereon, manually operable means on the frame and movable into the path of the crank portions to oscillate the same to move the dogs on the oscillatable shafts out of engagement with the teeth in the annular rim portions on the first disks and to arrest the tine frame before it has made a complete revolution and to hold the tine frame in transport position.

7. In a structure according to claim 6, said tine frame having a plate extending radially therefrom, said frame having a pivoted arm one end of which projects into the path of the tine frame and serving to allow the plate extending radially therefrom to pass by the said one end of the pivoted arm and to be engaged by the pivoted arm to prevent reverse rotation of the tine frame.

NOAH H. GODLEY.

REFERENCES CITED

The following references are of record in the file of this patent:

UNITED STATES PATENTS

| Number | Name | Date |
| --- | --- | --- |
| 241,013 | Hitchcock | May 3, 1881 |
| 683,445 | Cox | Oct. 1, 1901 |
| 1,477,382 | Pearson | Dec. 11, 1923 |
| 2,380,190 | Rutler | July 10, 1945 |